J. A. BOWDEN.
DETACHABLE TREAD FOR TIRES.
APPLICATION FILED MAY 25, 1909.
1,050,798.
Patented Jan. 21, 1913.
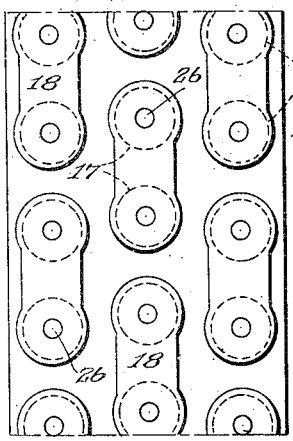
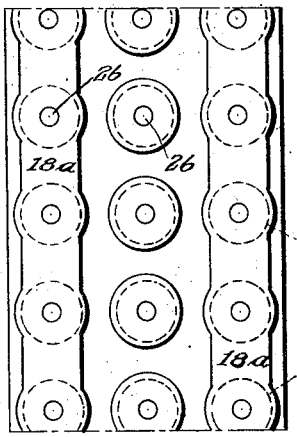
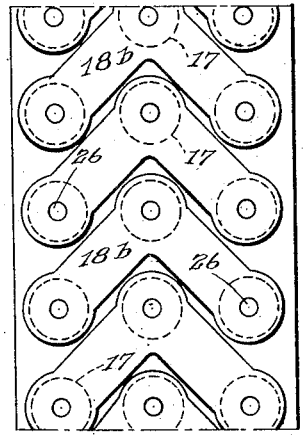
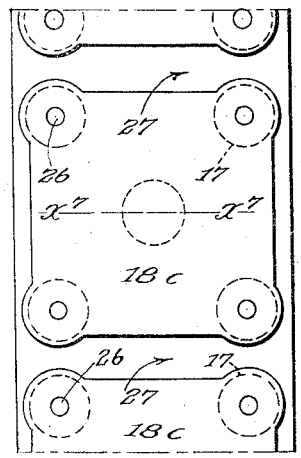
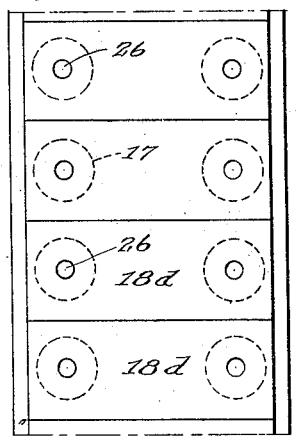
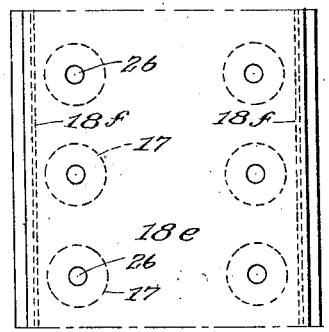
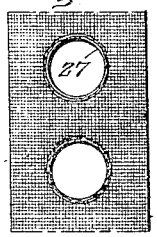
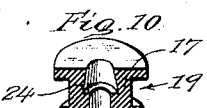
Witnesses.
Geo. J. Huting.
Louis N. Gratz.
Inventor.
Junius A. Bowden.

UNITED STATES PATENT OFFICE.

JUNIUS A. BOWDEN, OF LOS ANGELES, CALIFORNIA.

DETACHABLE TREAD FOR TIRES.

1,050,798.  Specification of Letters Patent. Patented Jan. 21, 1913.

Application filed May 25, 1909. Serial No. 498,363.

*To all whom it may concern:*

Be it known that I, JUNIUS A. BOWDEN, a citizen of the United States, residing at Los Angeles, in the county of Los Angeles and State of California, have invented a new and useful Detachable Tread for Tires, of which the following is a specification.

This invention relates to means whereby the tread of a tire may be readily renewed at slight expense, obviating the expense of the vulcanizing process. It also provides a tread which prevents skidding and affords better traction than the smooth surfaced tire and enables a casing or shoe to be used for a longer time than when the surface of the actual shoe or casing comes in contact with the road-way and acts as the wearing portion of the tire.

In previous applications of mine, Serial No. 414,827, filed February 7, 1908, Serial No. 427,544, filed April 16, 1908, Serial No. 466,178, filed December 5, 1908, and Serial No. 468,397, filed December 19, 1908, I have shown detachable treads consisting of devices in the form of studs which project from the surface of the casing and receive the wear and are detachable for purpose of renewal. In those applications I have shown various methods of detachably securing the studs in position and in the present application I have shown a construction for securing the studs in position which I consider to be an improvement over any of those which I have heretofore invented. In the present application I have also made an improvement in the wearing portion of the renewable tread whereby it is possible to provide a surface having a much greater area for contacting with the road-way and for receiving the wear than is afforded by the single stud. Owing to the greater extent of wearing surface thus presented, the tread portion will wear for a longer period than the single studs and will thus not require so frequent renewal. In addition to the increased life of the tread portion, I have shown several forms wherein the tractive or anti-skidding qualities are equal, if not superior, to the anti-skidding qualities of the individual studs.

The present invention is not in all uses restricted to the employment of the enlarged or extended contact portions as the means for securing such extended wearing portions to the casing may be employed for securing single studs in the casing whenever it is preferred to use the studs.

Further advantages of the present invention will be brought out in detail in the description.

Referring to the drawings: Figure 1 is a plan view of a portion of the tire showing one form of detachable tread wearing unit. Fig. 2 is a view similar to Fig. 1, showing another form of detachable tread unit. Fig. 3 shows another form of detachable tread unit. Fig. 4 is a view similar to Fig. 1, showing another form of detachable tread unit. Fig. 5 is a view similar to Fig. 1, showing another form of detachable tread unit. Fig. 6 is a view similar to Fig. 1, showing another form of detachable tread unit, the unit having an extended length and adapted to completely encircle the tire. Fig. 7 is an enlarged sectional view on line $x^7$—$x^7$ Fig. 4. Fig. 8 is a sectional view through the tread portion of the casing provided with a detachable stud. Fig. 9 is a perspective of the closing plug used in the form shown in either Figs. 7 or 8. Fig. 10 is a perspective of the detachable stud shown in Fig. 8. Fig. 11 is a perspective view in section of the receptacle used in Fig. 8. Fig. 12 is a perspective view of the two members forming the expansible anchor. Fig. 13 is a perspective of the expanding pin. Fig. 14 is a perspective view in longitudinal section of one form of cup. Fig. 15 is a plan view of the fabric adjacent the perforations. Fig. 16 is a perspective of the anchor plate. Fig. 17 is a view similar to Fig. 7 showing a modification.

Fig. 7 shows the means for detachably securing wearing units of the form shown in Fig. 4, as well as the other forms of detachable tread units shown in Figs. 1, 2, 3, 5 and 6. 1 designates the casing of the tire which is built up of any suitable material or combination of materials, for example, the outer strip 2 of rubber, the next strip of cotton 3, the next strip of thin rubber 4, the next strip of thick rubber 5, followed by a strip of cotton 6, the succeeding layers being repeated in reverse order toward the inner wall of the casing. 7 designates a receptacle preferably of sheet metal pressed into shape, its bottom being formed with a depressed central portion 8 and the upper part of the receptacle comprising a flat radial flange 9 which unites with a cylindrical neck 10 and the bottom of the latter unites with a flange 11 which is parallel with the flange 9, and the flange 11 unites with the side walls or main body portion of the receptacle. There is thus formed an external annular groove 12 and an internal annular groove 13. Permanently retained within the internal groove 13 is an anchor plate 14 shown in detail in Fig. 16, which is formed out of sheet metal with a raised vertical flange 15 and the bottom having a central perforation 16. The anchor plate 14 is placed in position in the receptacle or cup 7 during the formation of the cup so that after the cup is fully formed the anchor plate is permanently retained within the groove 13. In one of the above mentioned applications of mine, Serial No. 468,397, which most closely approximates this form of fastening, the anchor plate is retained in the bottom portion of the cup by the stud which surmounts it, the anchor plate being prevented from rising by that part of the stud which intervenes between the flange 11 and the bottom of the cup. In the present case the stud is not depended upon for holding the anchor plate in the bottom part of the cup as the flange 15 of the anchor plate bears against the lower face of the flange 11 of the cup, thereby positively holding the anchor plate within the cup and the lower part thereof without dependence upon the stud. Within the cup is a lug 17, which corresponds to the lower part of the stud in the previous application referred to, the lug 17 projecting inwardly from the outer tread unit 18, the latter resting against the outer surface of the casing and being secured within the cup by the lug 17 and correlated locking devices as shown in Fig. 10. The lug 17 is formed with an external annular groove 19 and with a lower flange 20 which fits within the inner annular groove 13 of the cup. This flange 20 may be of less diameter than the lower flange of the stud in the previous application because in the present case the stud is not depended upon to hold the anchor plate 7, and thus the lug 17 may be more easily inserted in the cup than when the flange 20 thereof is of greater diameter. This is important, as in the present case the detachable tread unit 18 is secured to the casing by the plurality of lugs 17 and as the lugs 17 are underneath the tread units 18 and as they must accurately aline with the respective cups, it is more difficult to insert them, which difficulty is minimized by reducing the diameter of the flange 20.

The external contour of the stud conforms to the internal contour of the cup so that when the stud is in place in the cup it is snugly seated therein and the lower flange 20 is seated within the anchor plate 14 and fits the flange 15 of the anchor plate, while the neck 10 of the cup fits within the groove 19 of the lug 17. As the lug 17 is of rubber and compressible, it may be contracted to permit the flange 20 to pass through the contracted neck 10 of the cup. After the lug is in position in the cup it is detachably locked therein by means of two anchor members 21, each of which, as shown in Fig. 12, is segmental in form, and the top of each anchor member has a lip 22 and at the bottom has a foot 23. The lug has a conical recess 24$^a$ and the anchor members 21 are slipped through the recess 24$^a$ into position after the lug is in place so that each foot 23 is engaged under the anchor plate 14, while each upper lip 22 engages over a shoulder 24 formed in the stud. After the anchor members are in position an expansion pin 25 is inserted between the anchor members 21 and the latter are thus forced apart into intimate engagement with the rubber plug and with the anchor plate. To fill the conical hole in the rubber plug above the anchor members, a filling plug 26 is inserted.

The conical shape of the filling plug 26 more securely retains it in position than if it were cylindrical. After the expansion pin 25 has been inserted the lug is absolutely held within the cup and the tread unit 18 is thus securely locked to the tire and cannot possibly be removed therefrom without first removing the pins 25 and anchor members 21, because the amount of rubber which constitutes the flange 20 of the lug which is contained within the internal groove 13 of the cup is so great that it is impossible to compress it sufficiently to enable it to pass out through the annular space between the neck of the cup and the anchor members 21. The anchor members can not yield because they are positively prevented from doing so by the incompressible expansion pin 25. The engagement of the lips 22 of the anchor members with the shoulder 24 of the stud still further locks the stud in position. On the other hand, when it is desired to move the tread unit it is an easy matter to first remove the filling plugs 26 after which, by withdrawing the expansion pins 25, the anchor members 21 may be slipped out and then the lugs will be allowed to contract sufficiently to be drawn out through the necks of the cups. A further advantage of this construction is that the anchor members 21 are themselves mechanically prevented from accidental removal because their feet 23 are positively held under the anchor plate 14 and the latter in turn is permanently retained within the groove 13 of the cup and is mechanically held in the lower part thereof by the flanges 15.

The tread units may be of various forms. Fig. 1 shows each tread unit 18 as extending circumferentially of the tire and having two lugs, one at each end for locking it in position. Fig. 2 shows the tread unit 18$^a$ extending circumferentially of the tire and in the form of a strip which may encircle the tire, each strip being provided with the locking lugs spaced apart a sufficient distance to not appreciably weaken the casing and yet sufficiently close together to securely hold the tread units in place. Fig. 3 shows each tread unit 18$^b$ V-shaped and provided with three locking lugs, there being a locking lug at each end of the unit and also one at the apex of the unit. The apexes of the units are preferably arranged in front so that the diverging arms of the tread unit tend to throw the dust and mud laterally from the tire instead of scooping it in toward the center. Owing to the angular construction of the tread units this form is particularly efficacious in preventing skidding. Fig. 4 shows the tread unit 18$^c$ of substantially square form held in place with five locking lugs. The respective tread units 18$^c$ are spaced apart to form recesses 27 transversely of the tire which enable the edges of the tread units to take a good grip on the roadway. Each of the tread units 18$^c$ is secured to the body of the tire by five lugs 17. The side edges of each tread unit prevent side slipping or skidding. Fig. 5 shows the tread units 18$^d$ as arranged transversely of the tire and set close together, thus forming a continuous tread wearing surface which completely encircles the tire. Fig. 6 shows a tread unit 18$^e$ which is in the form of a wide single piece band which may encircle the tire and be provided along each edge with a row of locking lugs suitably spaced apart for securing it to the tire. The band 18$^e$ is further secured by wires 18$^f$ in the edges thereof which bind it against the casing. Fig. 7, which is a section through Fig. 4 on line $x^7$—$x^7$, shows the lug 17 to be integral with the plate or unit 18$^c$. Fig. 8 shows the cup 7$^a$ constructed without the top flange 9. In this form the outer rubber layer 2 of the tire extends over the upper rim of the neck 10, the latter being below the surface of the tire. This style cup permits of building up layers of cotton and rubber above the lower flanged portion of the cup, without cutting out or perforating these layers any more than the actual size of the upper neck portion of the cup, thus preserving the maximum strength of these layers, bringing the perfect unbroken circle or perforation in uniform close contact around the neck of cup above the lower flanged bottom.

Fig. 15 shows how the cotton, or other fabric 3, is formed with a selvage 27 around the edge of the orifice which strengthens the fabric at this point where it is most liable to tear.

Fig. 17 shows a modification in which the anchor plate 14$^a$ is held in the upper part of the groove by a flange 15$^a$ which projects down instead of up as in the preceding forms. The cup 7$^b$ may be secured by a screw 28 which passes through the depressed bottom portion 8 of the cup and through the underlying portion of the casing, and being screwed through a washer 29, the lower end of the screw 28 being headed to prevent the nut unstrewing. In this form the upper rim of the cup is doubled back on itself to form a rounded edge, thereby giving a smooth surface which will not cut the rubber and also reinforcing the edge of the cup.

What I claim is:

1. In a tire, a cup in the tread portion thereof, said cup having an internal shoulder, an anchor plate within said cup and retained below said shoulder, the anchor plate having a dished flange which holds the anchor plate below the shoulder, and a detachable tread portion interlocked with said anchor plate.

2. In a tire, a cup in the tread portion thereof, said cup having an internal shoulder, an anchor plate within said cup and retained below said shoulder, the anchor plate having a dished flange which holds the anchor plate below the shoulder, and a detachable tread portion interlocked with said anchor plate and also interlocked with said cup.

3. In a tire, a cup in the tread portion thereof, said cup having an internal shoulder, an anchor plate retained below said shoulder and having a dished flange holding it below the shoulder, the anchor plate having a perforated bottom, a renewable tread portion extending into said cup, and anchor members engaging said renewable tread portion and extending through the perforation in the anchor plate.

4. In a tire, a cup in the tread portion thereof, said cup having an internal groove, an anchor plate and unyielding means for positively holding it in the bottom of said groove, the anchor plate having a perforated bottom, a renewable tread portion extending into the cup and having a perforation the walls of which have a shoulder, anchor members having lips engaging said shoulder, the anchor members extending through the anchor plate and having feet engaging the bottom of the anchor plate, and an expansion pin between the anchor members holding them apart.

5. In a tire, a cup in the tread portion thereof, said cup having an internal groove, an anchor plate in said groove, a renewable tread portion projecting into the cup and having a perforation, the outer portion of which is conical, means engaging in said perforation and detachably connected to the anchor plate, and a conical plug fitting the conical recess in the renewable tread portion.

6. As a new article of manufacture, a renewable tread portion for vehicle tires comprising a plate having integral lugs adapted to seat in recesses in a tire, the plate having a series of perforations which extend through the lugs and formed with internal shoulders, the wall of each perforation above the shoulder being frusto-conical with the smaller diameter at the surface of the plate.

7. As a new article of manufacture, a detachable elastic tread, having numerous integral projections adapted to fit in recesses in a tire, and having central perforations with shouldered walls through said projections and tread.

8. As a new article of manufacture for the tread of tires, a rubber stud having a cavity with shouldered walls through it and adapted to receive a plug for filling in said cavity.

9. As a new article of manufacture, for the tread of tires, a metal cup having an internal shoulder, and a perforated anchor plate with a dished flange permanently secured in said cup, below said shoulder.

10. In a tire, a metal cup having an external annular hollow flanged bottom, the sides of the cup, above said flanged bottom being of smaller diameter and extending approximately straight to its top, said cup secured in the tread, by means of alternate layers of canvas and rubber, said layers perforated of a size to register with the external diameter of said cup, the edges of said perforations being formed with a selvage above the flanged bottom, to make a snug fit and vulcanized thereto for firmly holding the cup in the tire, a detachable tread portion secured in the cup and projecting therefrom.

11. For vehicle tires, the combination of a metal cup, said cup secured in the tread portion thereof, an elastic part detachably locked in said cup, said part having an extension portion above the top of said cup formed with a conical shaped cavity, and a conical shaped plug filling said cavity.

12. In a tire, a cup in the tread portion thereof, said cup having an internal shoulder, an anchor plate within said cup, the anchor plate having an upwardly extending flange which engages the shoulder and holds the anchor plate below the shoulder, and a detachable tread portion interlocked with said anchor plate.

In testimony whereof, I have hereunto set my hand at Los Angeles, California, this 20th day of May, 1909.

JUNIUS A. BOWDEN.

In presence of—
 G. T. HACKLEY,
 P. H. SHELTON.